US008333828B2

(12) United States Patent
Donnelly

(10) Patent No.: US 8,333,828 B2
(45) Date of Patent: Dec. 18, 2012

(54) DEGASSING OF HYDROCARBON FUEL

(75) Inventor: Joseph L. Donnelly, Auburn, WA (US)

(73) Assignee: Donnelly Labs LLC, Auburn, WA (US)

( * ) Notice: Subject to any disclaimer, the term of this patent is extended or adjusted under 35 U.S.C. 154(b) by 484 days.

(21) Appl. No.: 12/622,024

(22) Filed: Nov. 19, 2009

(65) Prior Publication Data

US 2010/0126436 A1 May 27, 2010

Related U.S. Application Data

(63) Continuation-in-part of application No. 12/008,991, filed on Jan. 15, 2008, now Pat. No. 7,780,149, which is a continuation-in-part of application No. 11/183,243, filed on Jul. 15, 2005, now Pat. No. 7,334,781, which is a continuation-in-part of application No. 10/939,893, filed on Sep. 13, 2004, now abandoned.

(51) Int. Cl.
*B01D 19/00* (2006.01)

(52) U.S. Cl. .................. 96/156; 95/19; 95/260; 95/261; 95/174; 95/204; 95/216; 96/174; 96/204; 96/216

(58) Field of Classification Search .................... 261/26, 261/27, 89, 90; 123/3, 198 R, 298, 306; 366/305; 96/156, 174, 204, 216; 95/19, 95/260, 261
See application file for complete search history.

(56) References Cited

U.S. PATENT DOCUMENTS

| | | | | |
|---|---|---|---|---|
| 745,489 | A * | 12/1903 | Goslee | 96/249 |
| 2,985,160 | A * | 5/1961 | Armstrong | 123/462 |
| 3,710,771 | A * | 1/1973 | Cinquegrani | 123/445 |
| 3,747,903 | A * | 7/1973 | Phelps | 261/27 |
| 3,799,125 | A * | 3/1974 | Hutchinson | 123/3 |
| 4,034,730 | A * | 7/1977 | Ayres et al. | 123/701 |
| 4,112,901 | A * | 9/1978 | Chapin et al. | 123/505 |
| 4,524,033 | A * | 6/1985 | Elledge | 261/18.3 |
| 4,765,932 | A * | 8/1988 | Muraji | 261/27 |
| 5,887,554 | A * | 3/1999 | Cohn et al. | 123/3 |
| 6,533,924 | B1 * | 3/2003 | Lesieur et al. | 208/244 |
| 6,827,047 | B2 * | 12/2004 | Qian et al. | 123/3 |
| 6,981,472 | B2 * | 1/2006 | Bromberg et al. | 123/3 |
| 7,334,781 | B2 * | 2/2008 | Donnelly | 261/90 |
| 7,780,149 | B2 * | 8/2010 | Donnelly | 261/27 |
| 7,938,385 | B2 * | 5/2011 | Donnelly | 261/26 |
| 2004/0099226 | A1 * | 5/2004 | Bromberg et al. | 123/3 |
| 2006/0055066 | A1 * | 3/2006 | Donnelly | 261/90 |
| 2010/0126436 | A1 * | 5/2010 | Donnelly | 123/3 |
| 2011/0253071 | A1 * | 10/2011 | Donnelly | 123/3 |

FOREIGN PATENT DOCUMENTS

JP 53-27725 A * 3/1978

* cited by examiner

*Primary Examiner* — Richard L Chiesa

(74) *Attorney, Agent, or Firm* — Olympic Patent Office, PLLC

(57) ABSTRACT

Various embodiments of the present invention are directed to degassing and cleaning of hydrocarbon fuel. Degassing of hydrocarbon fuel is a way to remove the dissolved gases which aid in the oxidation of the fuel as well as the removal of sulfur, water and other particulate matter through radial cavitation. This process allows for both improvements in efficiency as well as decrease in emissions of standard fuel and the re-refining of fuels which have broken down. University of Idaho did a study on the breakdown of diesel fuel and found out that 26% of the efficiency is lost by the 28th day after fuel processing. In one embodiment, the fuel is subjected to fluid-shear forces and cavitation.

5 Claims, 17 Drawing Sheets

--Prior Art--

802

Rotor Parameters

| |
|---|
| Rotor circumference |
| Rotor length |
| Pattern of rotor bore holes |
| Depth of rotor bore holes |
| Radius of rotor bore holes |
| Shape of rotor bore holes |
| Number of rotor bore holes |
| Surface roughness of rotor |
| Composition of rotor |
| Mass of rotor |
| Ratio of sum of rotor-bore-hole surface sections to rotor surface |
| Shape of rotor |

Figure 11A

Fuel Refining Unit Parameters

| |
|---|
| $d$ = distance from rotor surface to inner surface of rotor housing |
| $v$ = volume of rotor chamber |
| the ratio $\frac{d}{v}$ |
| Number of input ports |
| Pattern of input-port locations |
| Diameter of input ports |
| Shape of input ports |
| Number of exhaust ports |
| Pattern of exhaust-port locations |
| Diameter of exhaust ports |
| Shape of exhaust ports |
| Shape of inner-rotor-housing surface |
| Composition of inner-rotor-housing surface |
| Roughness of inner-rotor-housing surface |

Figure 11B

System Parameters

| |
|---|
| Volume of reservoir tank A |
| Volume of reservoir tank B |
| Diameters and lengths of hoses/tubes/fluid communications |

Figure 11C

Operational Characteristics

| |
|---|
| Fuel pressure within rotor chamber |
| Flow rate of fuel through rotor chamber |
| Rotor rotational velocity |
| Pressure in reservoir tank A |
| Pressure in reservoir tank B |
| Degree of vacuum in reservoir tank B |
| Average amount of fuel in each reservoir |
| Flow rate of fuel through reservoir tank B |
| Temperature within rotor chamber |
| Temperature in reservoir tank B |
| Type of fuel |
| Composition of fuel, including contaminants |

Figure 11D

Metrics

| |
|---|
| Miles/gallon |
| Concentration of CO in engine exhaust |
| Concentration of $NO_X$ in engine exhaust |
| Concentration of $SO_X$ in engine exhaust |
| Concentration of $O_3$ in engine exhaust |

Figure 11E

DEGASSING OF HYDROCARBON FUEL

CROSS-REFERENCES TO RELATED APPLICATIONS

This application is a continuation-in-part of application Ser. No. 12/008,991 filed Jan. 15, 2008, now U.S. Pat. No. 7,780,149, issued Aug. 24, 2010, which is a continuation-in-part of application Ser. No. 11/183,243 filed Jul. 15, 2005, now U.S. Pat. No. 7,334,781, issued Feb. 26, 2008, which is a continuation-in-part of application Ser. No. 10/939,893, filed Sep. 13, 2004, now abandoned.

TECHNICAL FIELD

The present invention relates to the field of hydrocarbon-fuel refining.

BACKGROUND OF THE INVENTION

FIG. 1 illustrates current fuel production and distribution. Crude oil is pumped from oil wells and delivered to oil refineries 102 by ships 104 and oil pipelines. The crude oil is refined at oil refineries, primarily by catalytic cracking of large, complex hydrocarbons to produce various lower-molecular-weight hydrocarbons and by fractionation, to produce various different types of fuel, including kerosene, diesel fuel, and gasoline. Each type of fuel is characterized by various parameters, including flash point, volatility, viscosity, octane rating, and chemical composition. In general, the fractionation process selects a molecular-weight range of alkane, alkene, and non-aliphatic crude oil components which results in each fraction having desired fuel characteristics, including desired flash points, volatilities, viscosities, and octane ratings. Gasoline and diesel fuel are then delivered by truck 106 or pipeline to various distribution points, including service stations 108, where the fuel is delivered to motor vehicles.

While the above-described fuel-processing and fuel-delivery system has successfully provided fuel for motorized vehicles for nearly a century, there are certain disadvantages to the system. For example, the refining process is carried out once, at the oil refinery 102, and once the fuel leaves the oil refinery, there is no further possible processing or processing-based quality control. From a thermodynamic standpoint, fuel is a relatively high-energy and low-entropy substance, and is therefore chemically unstable. Fuel is subject to a variety of chemical-degradation processes, including oxidation, polymerization, substitution reactions, many different additional types of reactions between component molecules and between component molecules and contaminates, absorption of solid and liquid contaminants, absorption of gasses, continuous loss of more volatile components by vaporization and release of vaporized fractions, contamination with water, and many other types of processes. The potential for fuel degradation is increased by the relatively large variation in times between refining and use, the ranges of temperature and other environment conditions that the fuel may be exposed to during delivery, storage, distribution, and while contained in the fuel tanks of motorized vehicles, and by many other factors beyond the control of fuel refiners and fuel distributors. It is likely that, in many cases, the fuel actually burned in internal-combustion engines may differ in chemical composition and characteristics from the fuel originally produced at the oil refinery. In one study conducted at the University of Idaho, a 26% drop in fuel-to-energy conversion was observed at 28 days following fuel processing.

A further consideration is that vehicles differ from one another, internal-combustion engines differ from one another, other internal-combustion-engine-powered devices and vehicles, including generators, pumps, furnaces, and other mass-movement and mass-conversion systems generally differ from one another, making it difficult, if not impossible, to economically produce fuels particularly designed and tailored for a particular use. Were it possible to refine a fuel to produce a fuel optimal for any particular use, it is likely that the vehicle, including automobiles, trucks, aircraft, and trains, or other internal-combustion-engine-powered device would exhibit greater fuel efficiency and produce fewer pollutants than when running on standard, mass-produced fuel. Furthermore, the characteristics of any particular vehicle, internal-combustion engine, and/or internal-combustion-engine-powered device may change dramatically over time, as the vehicle, internal-combustion engine, and/or internal-combustion-engine-powered device ages, and may also change dramatically depending on the extent and types of use and conditions under which the is vehicle, internal-combustion engine, and/or internal-combustion-engine-powered device operated.

For these and other reasons, fuel producers and distributors, motorized-vehicle designers and manufacturers, airlines, train company, transportation companies, heating oil users and distributers, fuel-storage providers, the boating industry, those needing to salvage contaminated or degraded fuel, and, ultimately, direct and indirect consumers of fuel seek new approaches to modifying and restoring fuel following initial refinement of the fuel.

SUMMARY OF THE INVENTION

Various embodiments of the present invention are directed to degassing hydrocarbon fuel, removing particulate matter from hydrocarbon fuel, finish-refining and restoring hydrocarbon fuel, and other processing of hydrocarbon fuel following initial refinement of the fuel. In one embodiment, a hydrocarbon fuel is subjected to fluid-shear forces and cavitation.

BRIEF DESCRIPTION OF THE DRAWINGS

FIGS. 11A-E show tables of parameters that need to be considered at the design and operational stages of on-board fuel refining according to certain embodiments of the current invention.

DETAILED DESCRIPTION OF THE INVENTION

Various embodiments of the present invention are directed to cleaning, re-refining, specifically modifying, and degassing hydrocarbon fuel at a point in time, following initial refinement and processing, and in a location where a final, finishing refinement can most effectively prepare the fuel for combustion. Embodiments of the present invention may be used on-board vehicles, within stationary fuel-reprocessing and re-refining stations, within mobile fuel-processing systems, including mobile fuel-delivery systems, fuel-storage systems, fuel-dispensing systems, and in many other situations in which fuel-refinement and/or reprocessing, prior to combustion, leads to better fuel efficiency, less pollutant emission, and other advantages.

Figure 1:
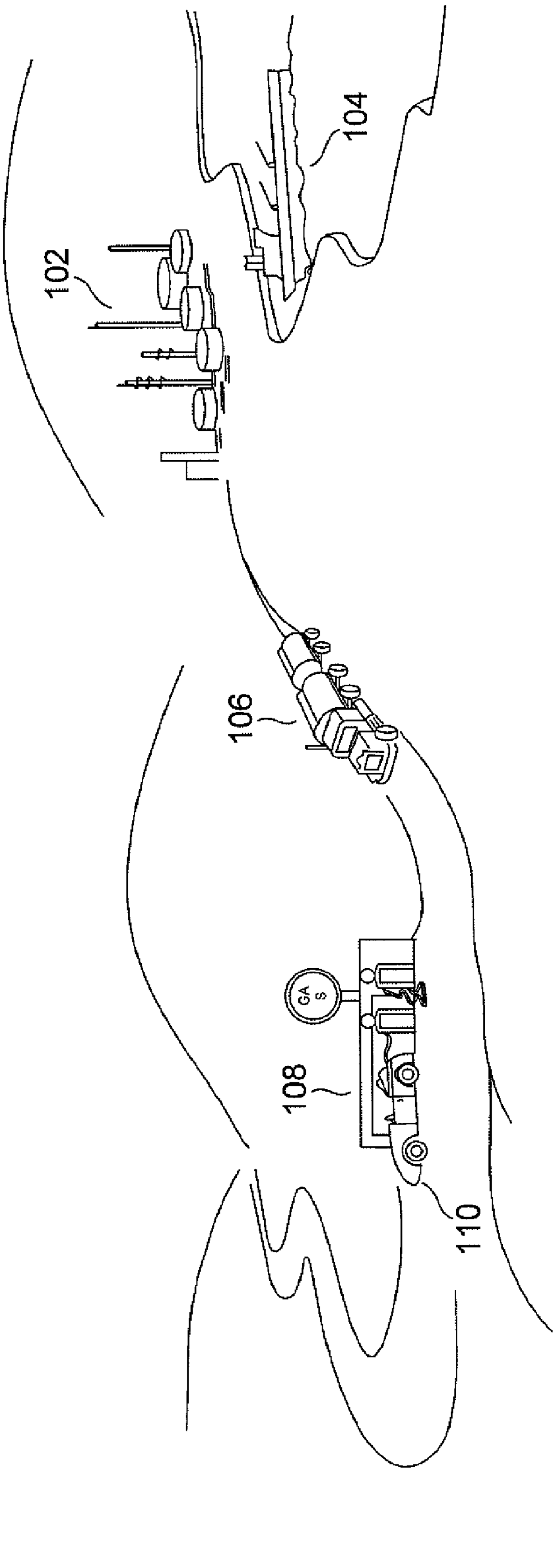
FIG. 1 illustrates current fuel production and distribution.
Figure 2:
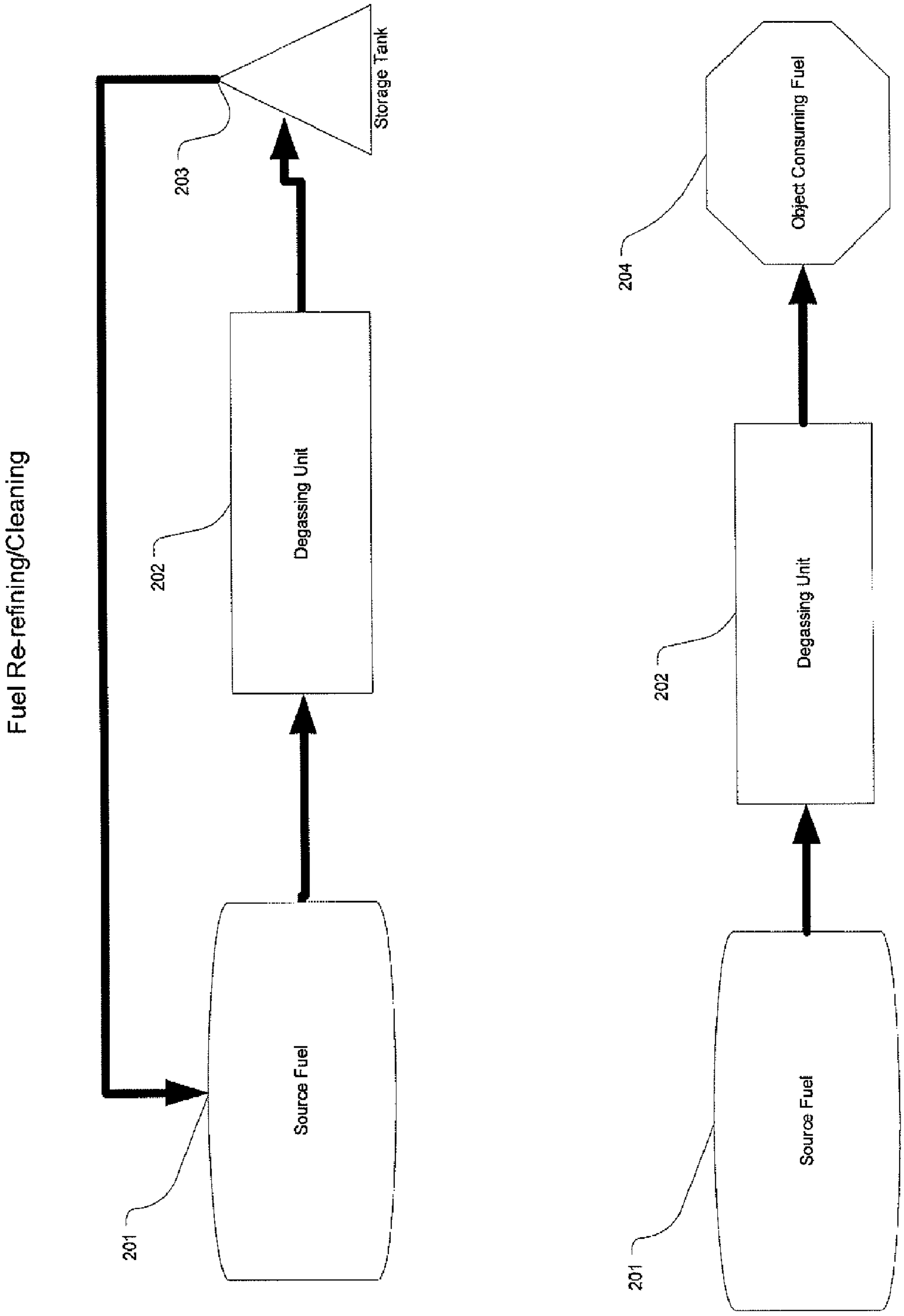
FIG. 2 illustrates on-board fuel refining that represents method-and-system embodiments of the current invention.

FIG. 2 illustrates on-board fuel refining that represents method-and-system embodiments of the current invention. As shown in FIG. 2, rather than fuel refining being carried out only once, at the oil refinery (102 in FIG. 1), in one embodiment of the present invention, fuel is reprocessed to clean and degas the fuel so that the fuel performs similarly to the performance that the fuel would have directly following initial refining. When the fuel is pumped from a source 201, the fuel is reprocessed in a degassing unit 202 and then stored in a storage tank 203, from which the fuel is returned to the source after the fuel has been treated. In another embodiment of the present invention, the fuel is processed from a source 201 and then returned directly to the source.

Figure 3:
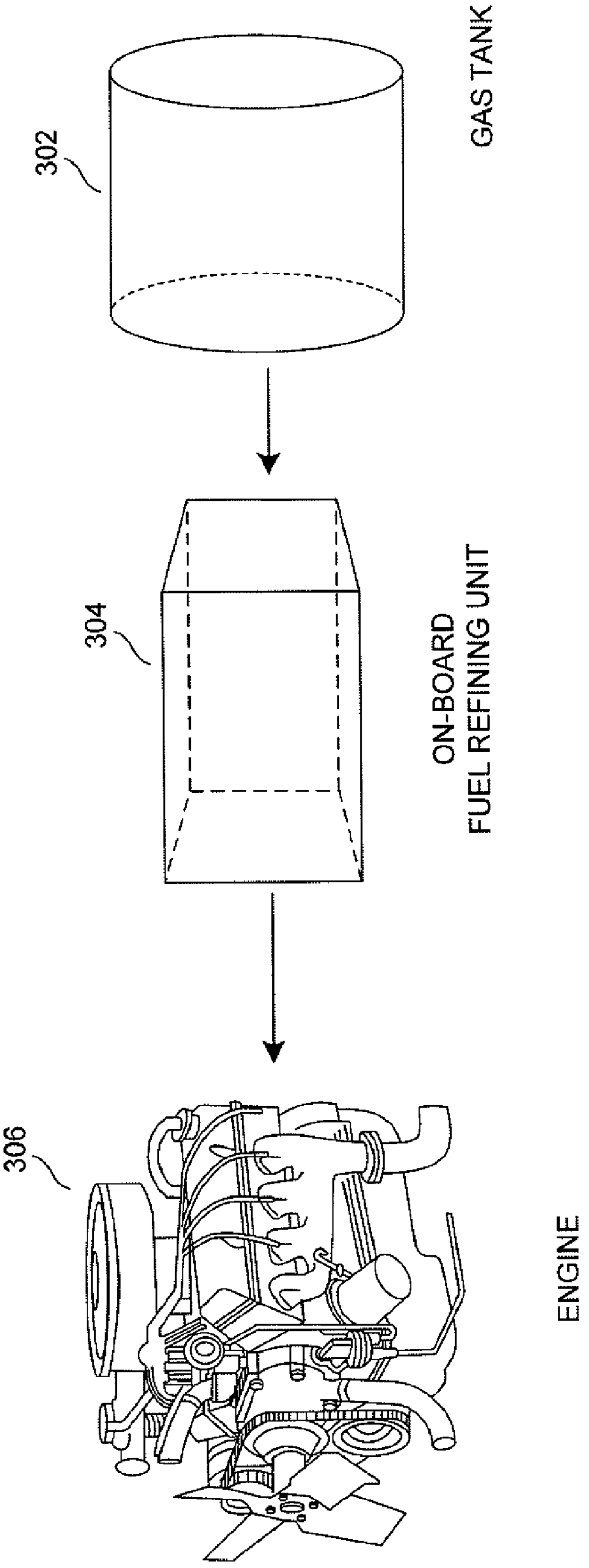
FIG. 3 shows the general approach of on-board fuel refinement on which embodiments of the present invention are based.

FIG. 3 shows the general approach of on-board fuel refinement on which embodiments of the present invention are based. Fuel is delivered to, and stored within, a fuel tank 302 within a motorized vehicle according to current fuel distribution methods. Fuel is withdrawn from the fuel tank 302 and refined by an on-board fuel-refinement system 304, which stores a certain amount of refined fuel. The engine 306 of the motorized vehicle consumes refined fuel produced by, and stored within, the on-board fuel-refinement system 304.

Figure 4:
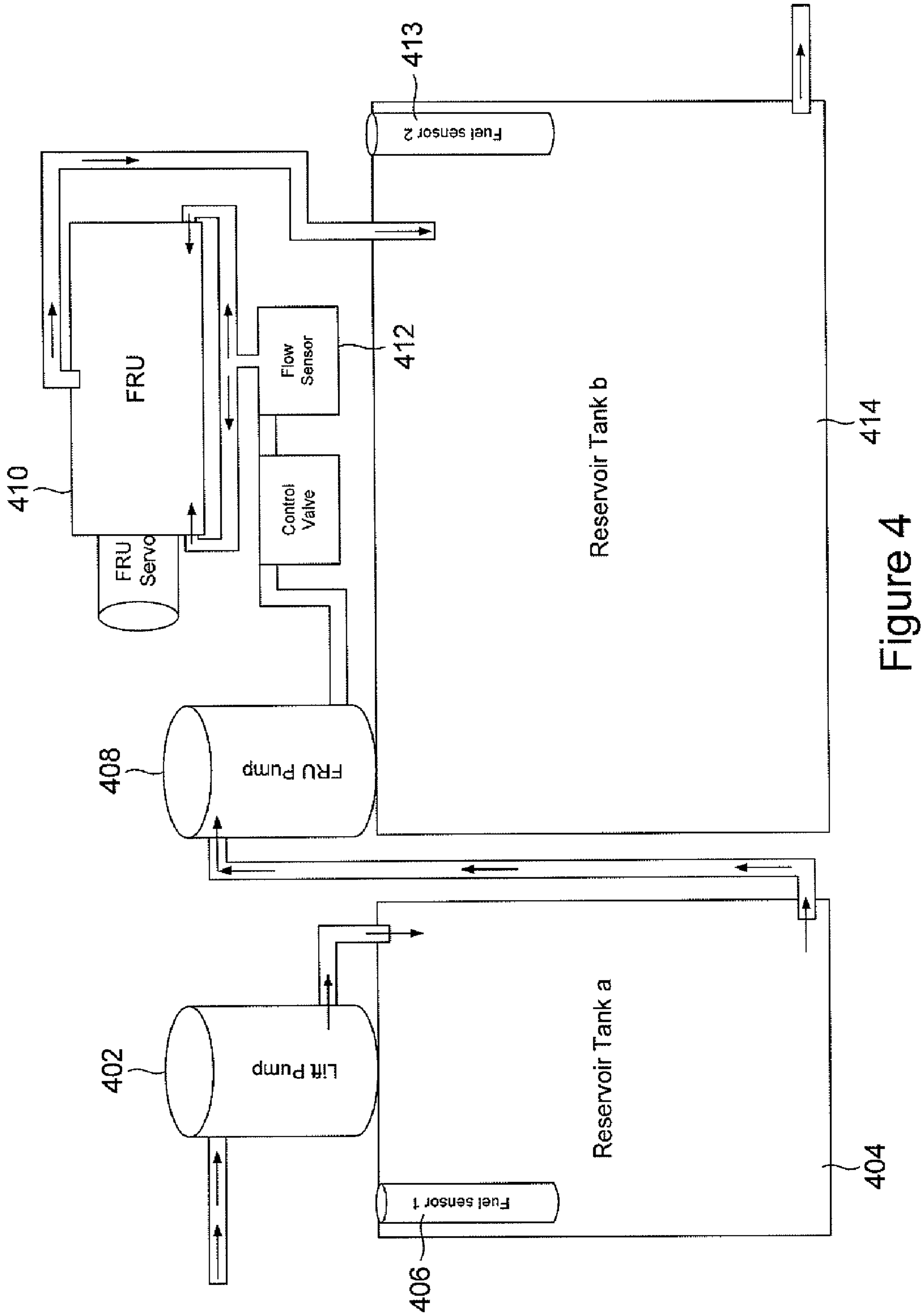
FIG. 4 illustrates an on-board fuel-refinement system that represents one embodiment of the present invention.

FIG. 4 illustrates an on-board fuel-refinement system that represents one embodiment of the present invention. Fuel is pumped from a vehicle's fuel tank by lift pump 402 and stored in a first reservoir, reservoir tank A 404 under control of a fuel sensor 406 in reservoir tank A that detects fuel levels within reservoir tank A. When the fuel level in reservoir tank A drops below a threshold amount, lift pump 402 is activated to draw additional fuel from the vehicle's fuel tank. The lift pump ensures that, regardless of the current pitch or roll of the vehicle, fuel will be available for on-board refining. Fuel is pumped by a second pump, the fuel-refining-unit pump 408, into the fuel-refining unit 410 under control of a flow sensor 412 and fuel sensor 412, and refined fuel is output to reservoir tank B 414, from which the refined fuel is drawn by the vehicle's fuel pump.

Figure 5:
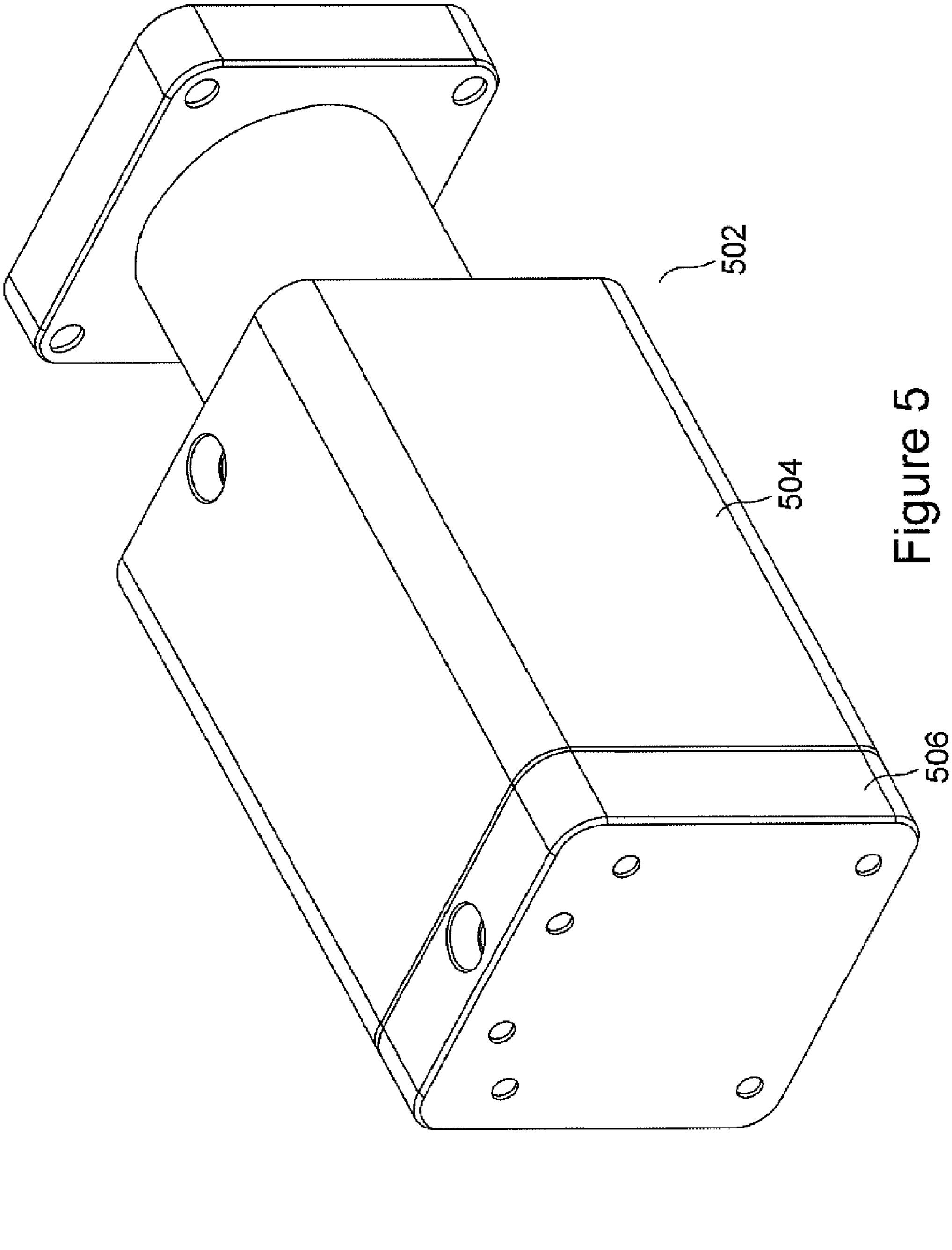
FIG. 5 shows an external view of a fuel-refining unit that represents one embodiment of the current invention from two different perspectives.

FIG. 5 shows an external view of a fuel-refining unit that represents one embodiment of the current invention. The fuel-refining unit 502 includes a rotor-and-rotor-chamber housing 504, a rotor-housing end cap 506, and a motor mount 508 that mounts the fuel-refining unit to a motor that spins a rotor within the fuel-refining unit in order to apply fluid shear forces to the fuel within the fuel-refining unit and generate cavitation within the fuel.

Figure 6:
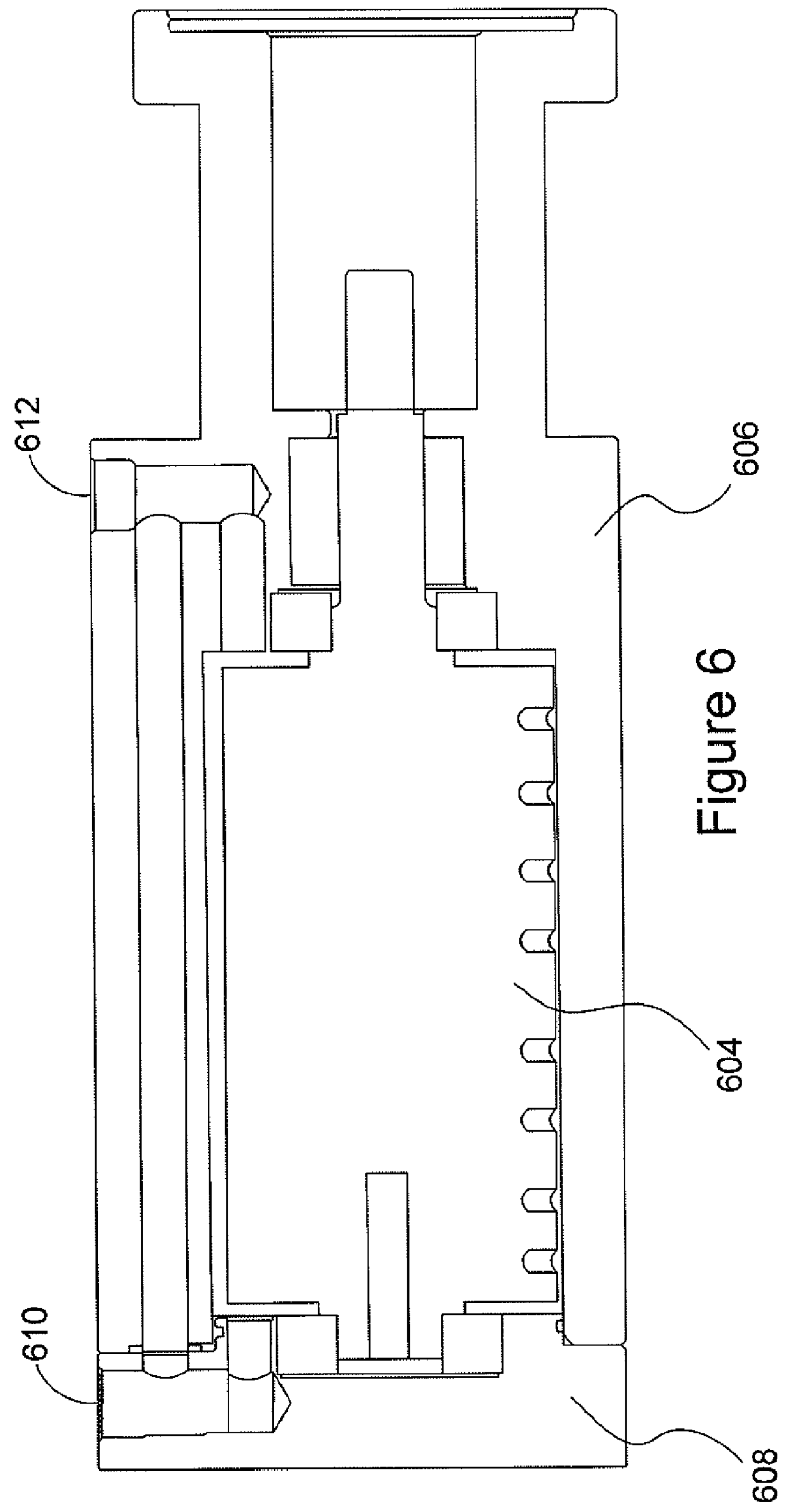
FIG. 6 shows a rotor chamber within a fuel-refining unit that represents one embodiment of the current invention from two different perspectives.

FIG. 6 shows a rotor chamber within a fuel-refining unit that represents one embodiment of the current invention. The rotor chamber 604 is an empty, enclosed and sealed, roughly cylindrical volume formed by the rotor-and-rotor-chamber housing 606 and rotor-housing end cap 608. Two inlet ports 610 and 612 provide channels through which fuel is input, under pressure generated by the fuel-refining-unit pump (408 in FIG. 4), into the rotor chamber.

Figure 7:
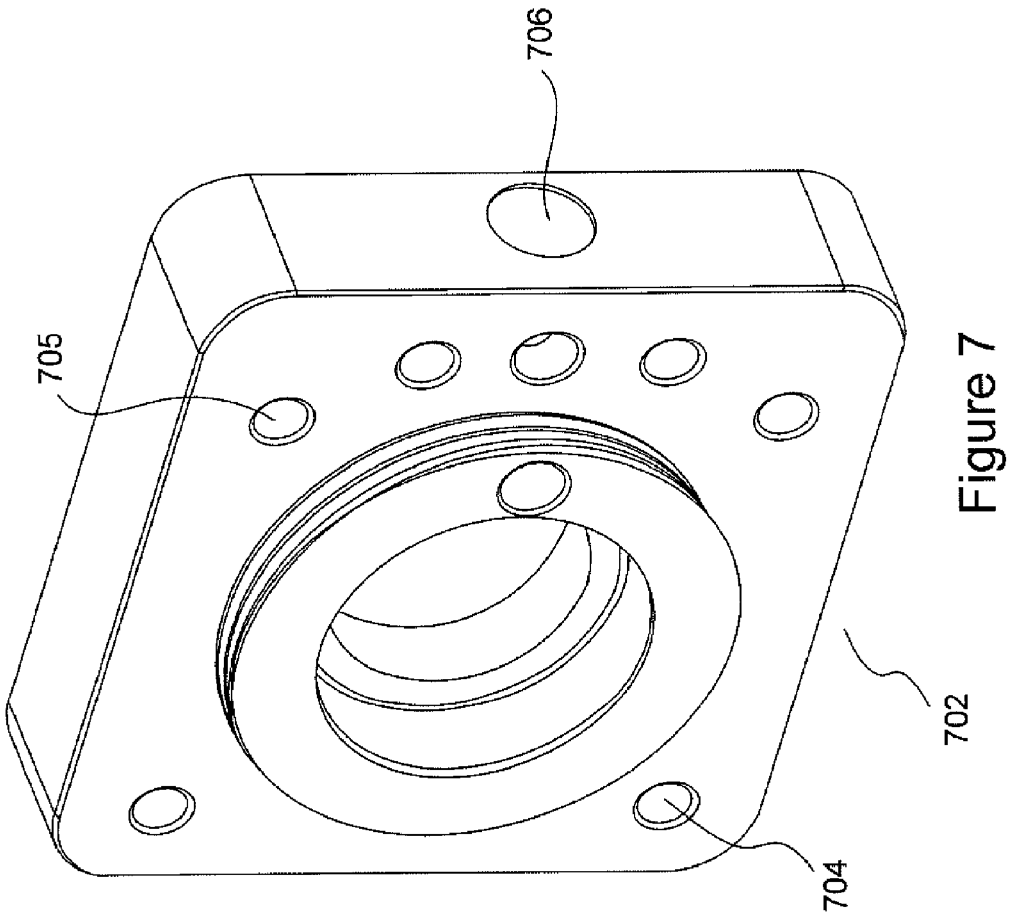
FIG. 7 shows a rotor-housing end cap of one embodiment of the current invention.

FIG. 7 shows a rotor-housing end cap of one embodiment of the current invention. The rotor-housing end cap 702 includes apertures for attachment bolts, including apertures 704-705, and the inlet port 706.

Figure 8A:
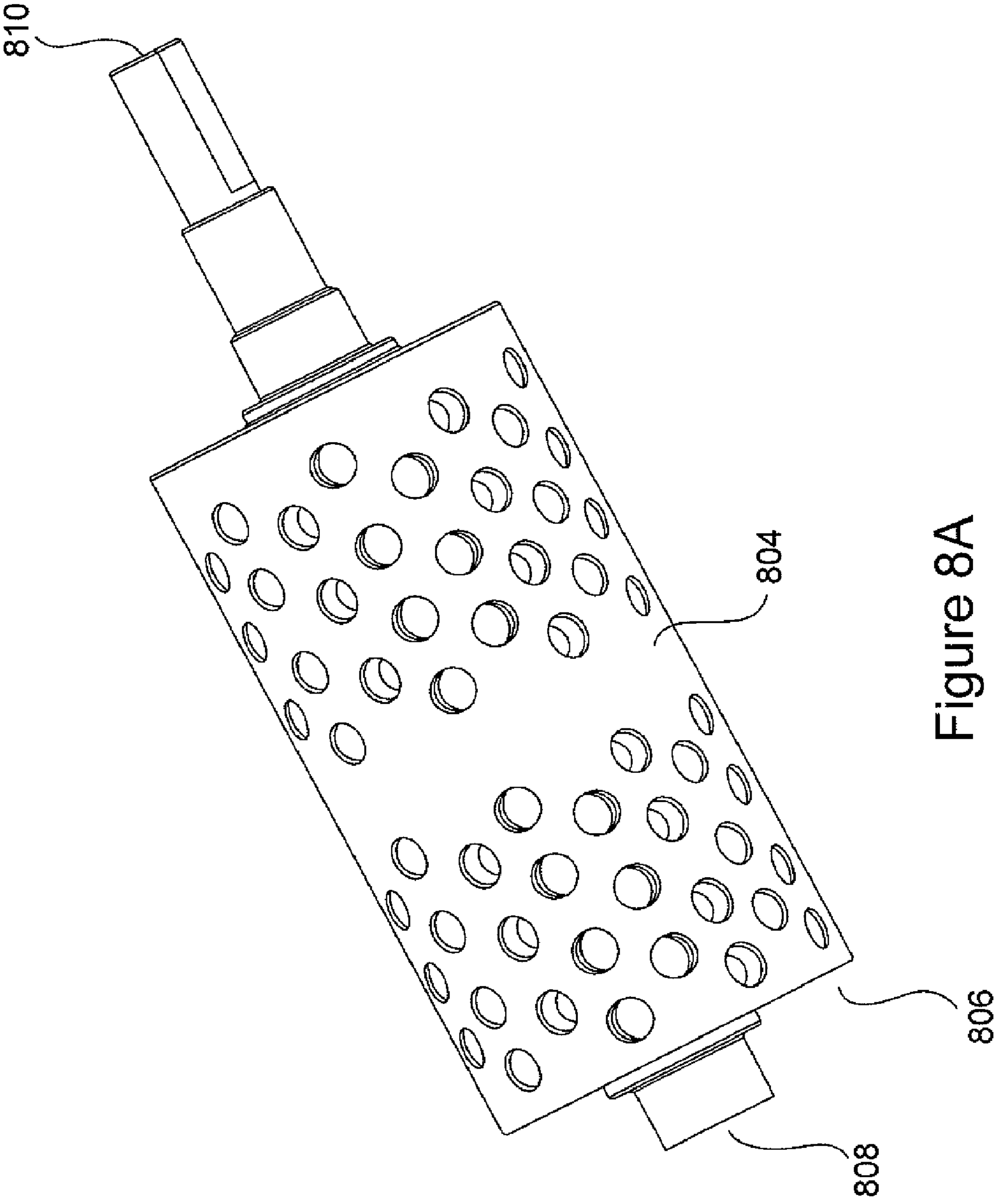
FIGS. 8A-B show two views of a fuel-refining-unit rotor according to one embodiment of the current invention.
Figure 8B:
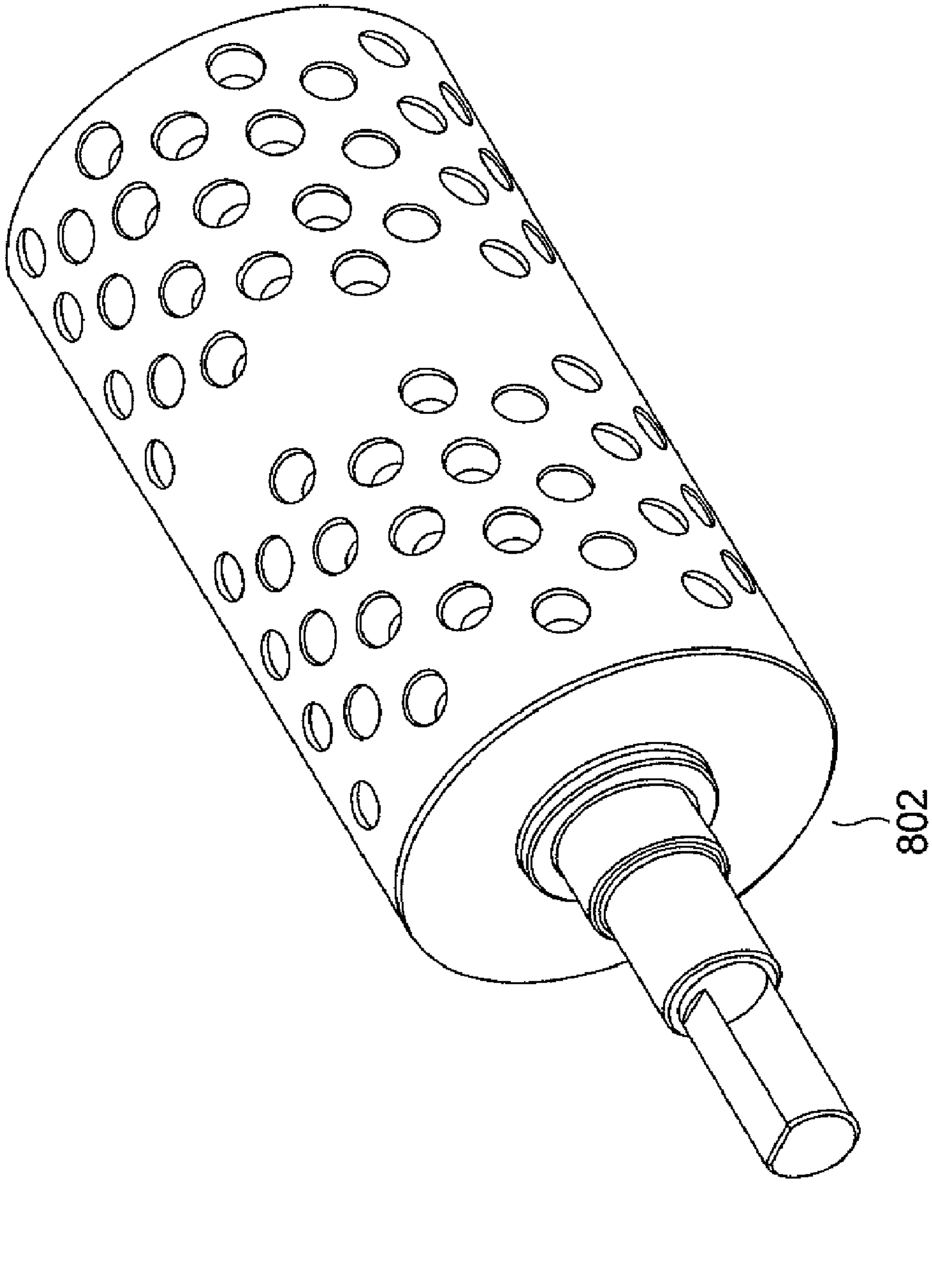

FIGS. 8A-B show two views of a fuel-refining-unit rotor according to one embodiment of the current invention. The rotor 802 includes a cylindrical fuel-processing surface, into which a number of radially-oriented depressions are machined, such as depression 806. The rotor includes a rotor shaft, on end of which 808 is ratably mounted in a complementary cylindrical mounting feature of the rotor-housing endplate, and the other end 810 of which is mounted through a coupling to the rotating shaft of a motor. The depressions, including depression 806, are arranged into a pattern on the cylindrical fuel-processing surface, with the pattern, diameter of the depressions, depth of the depressions, and shape of the depressions all potentially significant parameters with respect to the operational characteristics of the fuel-processing unit.

Figure 9A:
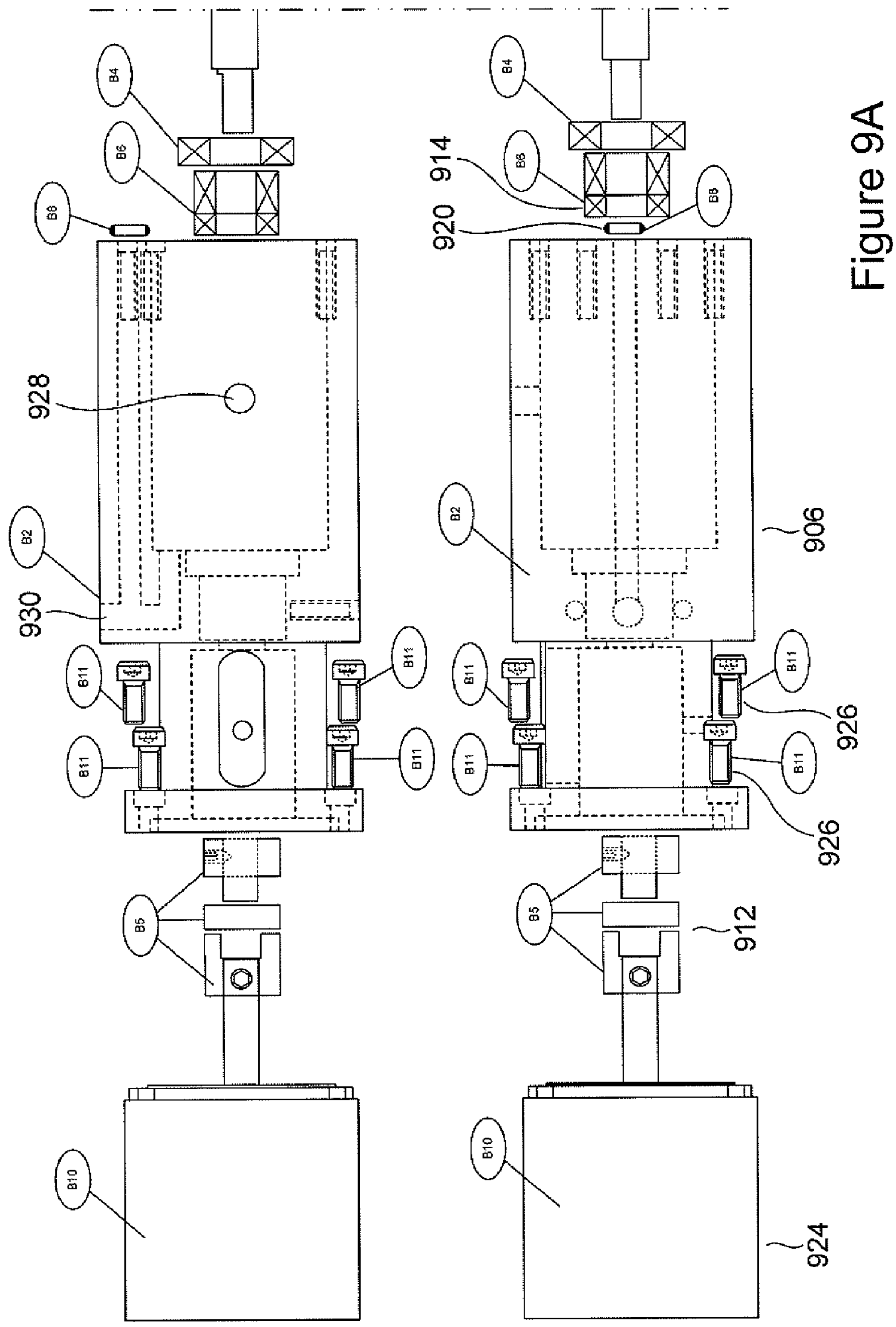
FIG. 9 shows an exploded diagram of a fuel-refining unit that represents one embodiment of the current invention from two different perspectives.
Figure 9B:
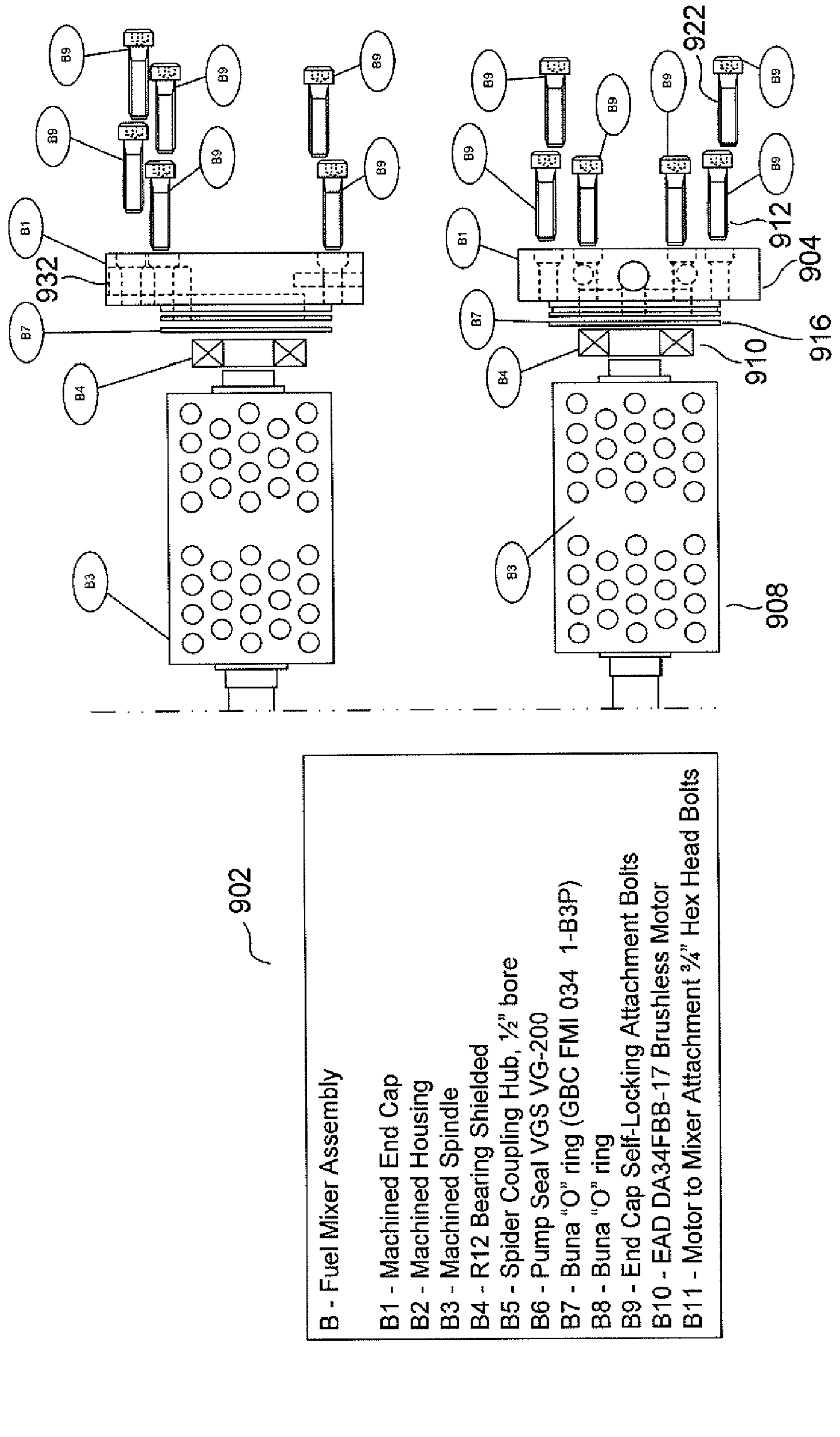

FIG. 9 shows an exploded diagram of a fuel-refining unit that represents one embodiment of the current invention from two different perspectives. The figure is shown with alphanumeric labels defined in a figure key 902. Numerical labels are additionally provided, and referred to in the following text. The exploded diagram of the fuel-refining unit shows many of the parts of the fuel-refining unit. These parts include: (1) a rotor-housing end cap 904; (2) a machined rotor-and-rotor-chamber housing 906; (3) a rotor 908; (4) a shielded bearing 910; (5) a spider coupling 912; (6) a pump seal 914; (7) a large-diameter "O" ring 916; (8) a small diameter "O" ring 920; (9) attachment bolts 922 that attach the rotor-housing end plate to the rotor-and-rotor-chamber housing; (10) an electric motor 924; (11) attachment bolts 926 that attach the motor-mount portion of rotor-housing end plate to the motor housing; (12) and exhaust port 928 from which fuel leaves the rotor chamber and is carried to reservoir tank B (414 in FIG. 4); and (13) inlet ports 930 and 932 through which fuel is introduced into the rotor chamber.

Figure 10:
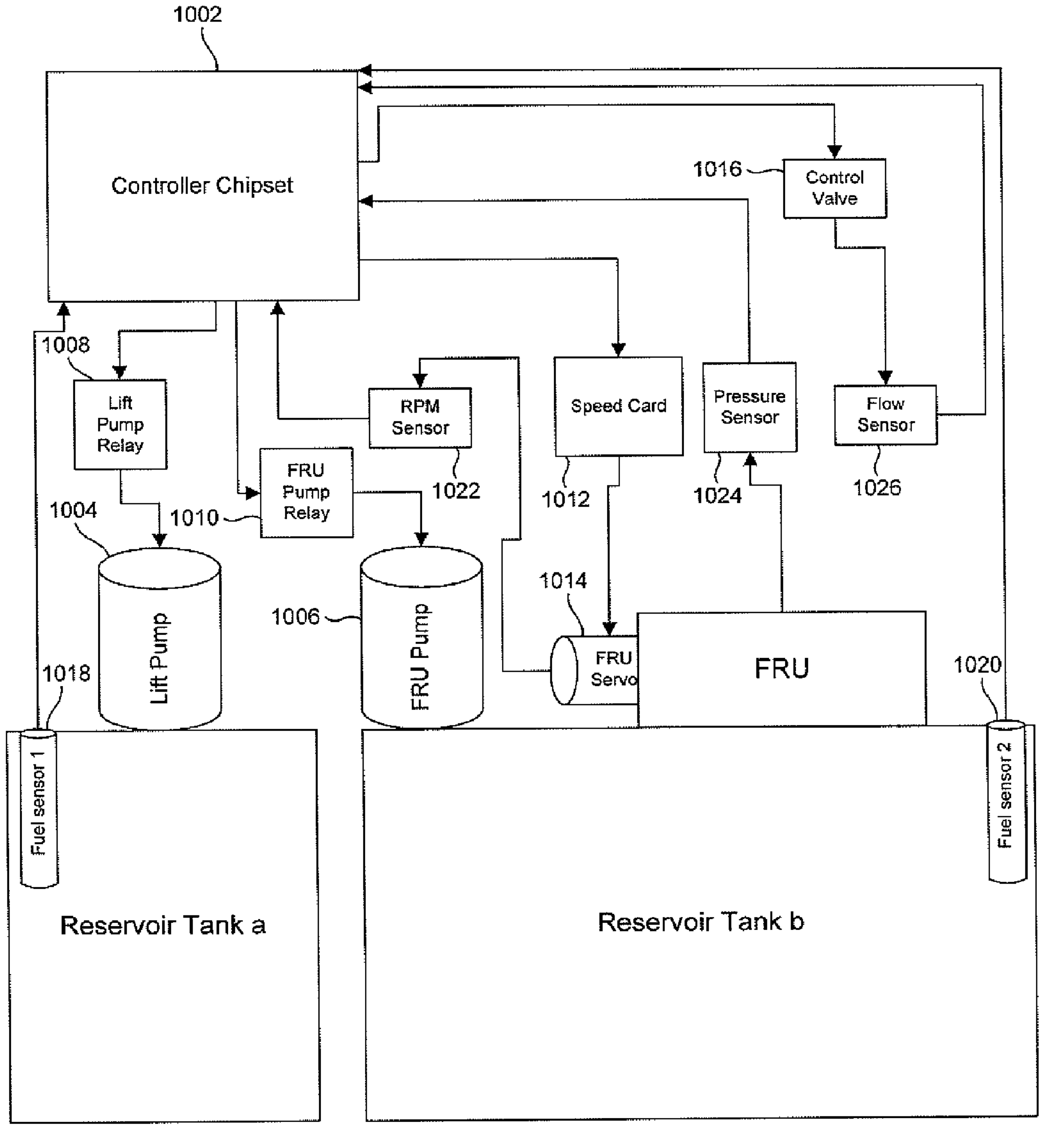
FIG. 10 shows the electronic control subsystem of an on-board fuel-refinement system that represents one embodiment of the current invention.

FIG. 10 shows the electronic control subsystem of an on-board fuel-refinement system that represents one embodiment of the current invention. The electronic control subsystem employs electrical input from a number of sensors and controls, and a control program, to dynamically start, stop, and vary parameters of the various active components of the on-board fuel-refining system of one embodiment of the current invention in order to optimize refining for the current conditions of engine operation. The control program runs on the controller chipset 1002, and continuously emits electronic signals to: (1) the lift pump 1004 (402 in FIG. 4) and the fuel-refining-unit pump 1006 (408 in FIG. 4) through relays 1008 and 1010, respectively; (2) a speed card 1012 that inputs signals to a fuel-refining-unit servo 1014 in order to control rotor function, including rotor speed; and (3) a control valve 1016 that, when open, admits fuel from the fuel-refining-unit pump to the fuel-refining unit. The control program receives inputs from various sensors and monitors, including: (1) fuel sensors 1018 and 1020 (406 and 412 in FIG. 4, respectively); (2) a rotor RPM sensor 1022; (3) a pressure sensor 1024 that reports the pressure of fuel within the fuel-refining unit; and a fuel-flow sensor 1026 that reports the rate of fuel flow into the fuel-refining unit.

FIGS. 11A-E show tables of parameters that need to be considered at the design and operational stages of on-board fuel refining according to certain embodiments of the current invention. FIGS. 11A-C provide tables that show various design parameters that affect characteristics of the refined fuel output from the fuel-refining unit and input to the internal-combustion engine of a motorized vehicle. FIG. 11D provides a table that shows various on-board-fuel-refining-system operational parameters that affect characteristics of the refined fuel output from the fuel-refining unit and input to the internal-combustion engine of a motorized vehicle. FIG. 11E provides a table of metrics, the values of which optimized by adjusting the parameters provided in FIGS. 11A-D in order to achieve optimal on-board fuel refining.

The table shown in FIG. 11A includes various rotor parameters, values for which are selected during design and trials of a degassing and cleaning fuel system. These rotor parameters include: (1) rotor circumference (or diameter, or radius); (2) rotor length; (3) pattern of rotor depressions; (4) depth of rotor depressions; (5) radii of rotor depressions; (6) shape of rotor depressions; (7) number of rotor depressions; (8) surface roughness of rotor; (9) composition of rotor; (10) mass of rotor; (11) percentage of ideal, cylindrical surface of rotor represented by depressions; and (12) rotor shape. In general, the depression-bearing surface of the rotor is cylindrical, but slight variations in the shape, including elliptical shapes and various patterns of longitudinal variations in radius are possible. The rotor surface and rotor depressions, spinning at high rates of revolution, induces fluid shear forces within the fuel in the rotor chamber, and may additional create cavitation. Cavitation produces extremely high, but short-duration temperatures that can induce a variety of chemical and physical changes of the fuel. Shear forces can also cause chemical changes, and the combined effects of pressurization and rotor forces may influence the types and quantities of dissolved gasses in the fuel, in addition to changing the chemical composition of the fuel. The above-listed parameters may all, separately or in various combinations, influence the fluid shear forces and amount of cavitation to which the fuel is subjected, as well as the amount of time that the fuel resides in the rotor chamber, average temperatures in the rotor chamber, and local temperatures produced by cavitation.

The table shown in FIG. 11B includes various fuel-refining-unit parameters, values for which are selected during design and trials of a degassing and cleaning fuel system. These rotor parameters include: (1) distance from the rotor surface to the inner surface of the rotor-and-rotor-chamber housing, d; (2) volume of the rotor-and-rotor-chamber housing, v; (3) the ratio d/v; (4) the number of inlet ports; (5) the spatial arrangement of inlet ports; (6) the diameter of inlet ports; (7) the shape of the inlet ports; (8) the number of exhaust ports; (9) the spatial arrangement of exhaust ports; (10) the diameter of exhaust ports; (11) the shape of the exhaust ports; (12) the shape of the inner-rotor-and-rotor-chamber housing; (13) composition of the rotor-and-rotor-chamber housing; and (14) roughness of the inner surface of the rotor-and-rotor-chamber housing. In general, the above-listed parameters principally affect the time to which fuel is exposed to refining conditions within the rotor chamber, temperature and pressure within the rotor chamber, and pressure of various gasses dissolved in, and in equilibrium with, the refined fuel. Fuel refining induces fluid shear forces within the fuel in the rotor chamber, and may additional create cavitation. The above-listed parameters may all, separately or in various combinations, influence the conditions to which the fuel is subjected in the rotor chamber, and therefore may affect the characteristics and parameters of the output, refined fuel.

The table shown in FIG. 11C includes various on-board-fuel-refining-system parameters, values for which are selected during design and trials of a degassing and cleaning fuel system. These on-board-fuel-refining-system parameters include: (1) volume of reservoir tank A; (2) volume of reservoir tank B; and (3) the diameters, lengths, and other characteristics of fluid connections between various stages and components of the on-board-fuel-refining-system. In general, the above-listed parameters principally affect the time to which fuel is exposed to refining conditions within the rotor chamber, temperature and pressure within the rotor chamber, and pressure of various gasses dissolved in, and in equilibrium with, the refined fuel.

The table shown in FIG. 11D includes various operational parameters of the on-board-fuel-refining-system, values for which are continuously adjusted during motor-vehicle operation. These operational parameters include: (1) fuel pressure within the rotor chamber; (2) rate of flow of fuel through the rotor chamber; (3) rotational velocity of the rotor; (4) pressures in reservoir tank A and B; (5) degree of vacuum in reservoir tank B; (6) average amount of fuel in each of reservoir tanks A and B, as well as thresholds for each reservoir tank that determine when corresponding pumps are activated or shut off; (7) rate of flow of fuel through reservoir tank B; (8) temperature within the rotor chamber; (9) the temperature in reservoir tank B; (10) the type of fuel; and (11) composition of fuel, including nature and amounts of contaminants. In general, the above-listed parameters principally affect the time to which fuel is exposed to refining conditions within the rotor chamber, temperature and pressure within the rotor chamber, and pressure of various gasses dissolved in, and in equilibrium with, the refined fuel. All of these parameters may, alone or in various combinations, affect the composition and characteristics of the output, refined fuel.

The table shown in FIG. 11E includes various metrics that define how the above-mentioned parameters are adjusted in order to obtain optimal or near-optimal on-board fuel refining. These metrics include: (1) fuel efficiency, or miles/gallon; and (2) the concentration of various pollutant gasses in the exhaust gas emitted by the internal combustion engine. In certain cases, the pollutant gasses may be monitored during engine operation, while, in other cases, minimization of the concentration of pollutant gasses is carried out during on-board-fuel-refining-system design and implementation and during installation and tuning of an on-board-fuel-refining-system within a particular motorized vehicle. In general, the miles/gallon ratio is continuously monitored by the on-board-fuel-refining-system controller in order to adjust refining parameters to achieve greatest fuel efficiency.

Optimization of fuel efficiency and pollutant-gas emissions can be carried out by any of many different optimization techniques, from empirical and heuristics-based optimization to true, mathematical optimization using continuously computed differentials and a steepest-descent or other mathematical optimization technique. Optimization may be carried out continuously, at intervals, or may be carried out with all parameters at intervals and with continuous optimization of a smaller set of critical parameters.

Although the present invention has been described in terms of a particular embodiment, it is not intended that the invention be limited to this embodiment. Modifications within the spirit of the invention will be apparent to those skilled in the art. For example, other types of mechanical, chemical, electrical, and other processes may be used in addition to, or instead of, the rotor-based fluid-shear and cavitation induction used in the disclosed embodiment. Such techniques may change the temperature, pressure, and other parameters of the fuel, and may apply various forces or conditions that allow activation barriers for specific chemical reactions to be overcome. Many different types of optimization techniques and parameter-monitoring and parameter-adjustment techniques may be used to tailor on-board fuel refinement to the specific and current conditions of the motorized vehicle and internal combustion engine. The various design and operational parameters, discussed above, have different optimal values for each different type of motorized vehicle, internal combustion engine, and fuel. The design and operational parameters are not necessarily independent from one another. In one diesel-truck embodiment of the present invention, the distance d is 0.1 inch, the rotor diameter is 2.4 inches, there are two fuel-inlet ports and one fuel-exhaust port, each inlet port and the exhaust port a ¼ inch NPT with a ⅜ inch JIC fitting, fuel pressure in the rotor chamber between 3 and 6 psi, flow rate through the rotor chamber of between 16 and 22 gph, and speed of the rotor revolution at 2735±50 rpm. In addition, it has been found optimal to switch between flow rates of 17 gph and 21 gallons per hour. In this embodiment, greater than 12% improvement in fuel efficiency was observed, with significant (4.5% to 18%) drops in the mentioned pollutant gasses. However, much greater fuel-efficiency increases have been observed under certain conditions of operation. The various parameters and characteristics are likely to vary depending not only on vehicle and engine type, but also on current environmental and driving conditions.

The foregoing detailed description, for purposes of illustration, used specific nomenclature to provide a thorough understanding of the invention. However, it will be apparent to one skilled in the art that the specific details are not required in order to practice the invention. Thus, the foregoing descriptions of specific embodiments of the present invention are presented for purposes of illustration and description; they are not intended to be exhaustive or to limit the invention to the precise forms disclosed. Many modifications and variation are possible in view of the above teachings. The embodiments were chosen and described in order to best explain the principles of the invention and its practical applications and to thereby enable others skilled in the art to best utilize the invention and various embodiments with various modifications as are suited to the particular use contemplated.

The invention claimed is:

1. A fuel-degassing-and-cleaning system comprising:

a first reservoir;

a lift pump that provides fuel to the first reservoir from the fuel tank of a motorized vehicle which employs an internal combustion engine;

a fuel-degassing-and-cleaning unit in which fuel is degassed and cleaned, the fuel-degassing-and-cleaning unit including a rotor driven by a motor, the rotor enclosed by a rotor-and-rotor-chamber housing that, together with the rotor, forms a rotor chamber in which fuel is subject to fluid-shear forces;

a fuel-degassing-and-cleaning unit pump that provides fuel from the first reservoir to the fuel-degassing-and-cleaning unit; and a second reservoir into which degassed and cleaned fuel output by the fuel-degassing and cleaning unit is introduced and from which fuel is drawn for combustion in the internal-combustion engine.

2. The fuel-degassing-and-cleaning system of claim 1 further including a controller that monitors input from sensors and that emits electronic signals to control fuel degassing and cleaning by the fuel-degassing-and-cleaning system.

3. The fuel-degassing-and-cleaning system of claim 2 wherein the input from sensors includes:

the fuel sensors in the first and second reservoirs;

a rotor-revolutions-per-second sensor;

a pressure sensor that reports pressure of fuel within the fuel-degassing-and-cleaning unit; and a fuel-flow sensor that reports rate of fuel flow into the fuel-degassing-and-cleaning unit.

4. The fuel-degassing-and-cleaning system of claim 2 wherein the controller emits electronic signals to:

the lift pump;

the fuel-degassing and cleaning unit pump;

a speed card that inputs signals to a fuel-degassing and cleaning unit servo in order to control rotor function, including rotor speed; and a control valve that, when open, admits fuel from the fuel-degassing and cleaning unit pump to the fuel-degassing and cleaning unit.

5. The fuel-degassing-and-cleaning system of claim 1 installed in one of:

a vehicle, including a train, automobile, truck, or airplane;

a pump;

a generator;

a furnace;

an internal-combustion-engine-powered device;

a mobile fuel-reprocessing system;

a stationary fuel-reprocessing system;

a fuel-storage system; and a fuel-dispensing system.

* * * * *